(12) United States Patent
Jung

(10) Patent No.: US 8,290,467 B2
(45) Date of Patent: Oct. 16, 2012

(54) NETWORK CONNECTION METHOD AND APPARATUS OF A MOBILE STATION

(75) Inventor: Jae Dong Jung, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1089 days.

(21) Appl. No.: 12/196,173

(22) Filed: Aug. 21, 2008

(65) Prior Publication Data
US 2009/0052432 A1    Feb. 26, 2009

(30) Foreign Application Priority Data
Aug. 24, 2007    (KR) ................ 10-2007-0085434

(51) Int. Cl.
*H04M 11/00* (2006.01)
(52) U.S. Cl. ..................................... 455/403
(58) Field of Classification Search .......... None
See application file for complete search history.

(56) References Cited

U.S. PATENT DOCUMENTS

| | | | |
|---|---|---|---|
| 7,046,776 B1* | 5/2006 | Henz et al. ............ | 379/114.02 |
| 7,519,027 B2* | 4/2009 | Wang et al. ............ | 370/331 |
| 7,724,706 B2* | 5/2010 | Kang et al. ............ | 370/331 |
| 8,144,580 B2* | 3/2012 | Pickering et al. ...... | 370/230 |
| 2004/0120283 A1 | 6/2004 | Rezaiifar et al. | |
| 2005/0147040 A1 | 7/2005 | Vayanos et al. | |
| 2007/0010262 A1* | 1/2007 | Kang et al. ............ | 455/458 |
| 2009/0252125 A1* | 10/2009 | Vujcic .................... | 370/336 |
| 2009/0296609 A1* | 12/2009 | Choi et al. ............. | 370/281 |
| 2011/0013592 A1* | 1/2011 | Uemura et al. ......... | 370/331 |

FOREIGN PATENT DOCUMENTS

| | | |
|---|---|---|
| KR | 10-2004-0025352 A | 3/2004 |
| KR | 10-2006-0122538 A | 11/2006 |
| KR | 10-2007-0027114 A | 3/2007 |

* cited by examiner

*Primary Examiner* — Chi Pham
*Assistant Examiner* — Fan Ng
(74) *Attorney, Agent, or Firm* — Jefferson IP Law, LLP

(57) ABSTRACT

A network connection method and apparatus for improving network connection performance of a mobile station in a Broadband Wireless Access (BWA) system is provided. A network connection method of the present invention includes checking whether a cell change from a first cell to a second cell is detected while waiting for a network connection request message, after an acquisition of a synchronization with a first base station associated with the first cell, determining, if the cell change is detected, whether a synchronization is acquired with a second base station associated with the second cell and whether the network connection request message is detected, initiating, if the network connection request message is detected after the synchronization is acquired with the second base station, a network entry procedure, saving, if the network connection request message is detected before the synchronization is acquired with the second base station, the network connection request message in a buffer, and initiating, if the synchronization is acquired with the second base station after saving the network connection request message, a network entry procedure using the network connection request message saved in the buffer.

11 Claims, 4 Drawing Sheets

NETWORK CONNECTION METHOD AND APPARATUS OF A MOBILE STATION

PRIORITY

This application claims the benefit under 35 U.S.C. §119(a) of a Korean patent application filed in the Korean Intellectual Property Office on Aug. 24, 2007 and assigned Serial No. 2007-0085434, the entire disclosure of which is hereby incorporated by reference.

BACKGROUND OF THE INVENTION

1. Field of the Invention

The present invention relates to a Broadband Wireless Access (BWA) system. More particularly, the present invention relates to a network connection method and apparatus that is capable of improving network connection performance of the mobile station to a BWA system such as Wireless Broadband (WiBro).

2. Description of the Related Art

A conventional base station provides the function of an access point to mobile stations located in its radio cell coverage area. The base stations are deployed so that their cells are partially overlapped with each other. In the overlapping area, a mobile station may attempt a call connection to a base station. Due to the mobility characteristic, the mobile station associated with a base station may move into a cell of another base station before completing the call connection with the serving base station.

That is, the mobile station that is served by a first base station may moves into a cell of a second base station. In this case, the connection profile of the mobile station for the first base station in Physical and Medium Access Control (MAC) layers is not available to the second base station. Accordingly, the mobile station has to perform a network entry procedure with the second base station for establishing call connection, as was done with the first base station.

As mentioned above, when moving from one cell to another, the mobile station has to make a connection to a handover target base station. At this time, since the serving base station and the new base station have different network profiles, the mobile station establishes the connection to the new base station in consideration of the different network profiles.

An exemplary base station in the WiBro system is a Radio Access Station (RAS) and an exemplary mobile station in the WiBro system is a Personal Subscriber Station (PSS). When a Personal Subscriber Station (PSS) attempts to make a WiBro call connection to a Radio Access Station (RAS) on the move and the cell is changed before the call connection procedure has completed, the PSS has to attempt the call connection with another RAS of the new cell, whereby network connection probability is likely to decrease and average connection processing delay increases, resulting in a degradation of service quality.

SUMMARY OF THE INVENTION

An aspect of the present invention is to address at least the above-mentioned problems and/or disadvantages and to provide at least the advantages described below. Accordingly, an aspect of the present invention is to provide a network connection method and apparatus that is capable of improving a network connection probability of a mobile station to a network, especially when the mobile station attempts a call connection while moving across multiple cells, by maintaining the call connection attempt.

Another aspect of the present invention is to provide a network connection method and apparatus that is capable of reducing connection processing delay by skipping signaling for a network entry procedure between a modem and a connection management module of the mobile station when a call connection procedure to a network is not completed.

A further aspect of the present invention is to provide a network connection method and apparatus that is capable of improving a network connection probability and reducing a connection processing delay by performing a retained network connection using a network entry request message received, on the move, from a last located network.

In accordance with an exemplary embodiment of the present invention, a network connection method of a mobile station is provided. The method includes checking whether a cell change from a first cell to a second cell is detected while waiting for a network connection request message, after an acquisition of a synchronization with a first base station associated with the first cell, determining, if the cell change is detected, whether a synchronization is acquired with a second base station associated with the second cell and whether the network connection request message is detected, initiating, if the network connection request message is detected after the synchronization is acquired with the second base station, a network entry procedure, saving, if the network connection request message is detected before the synchronization is acquired with the second base station, the network connection request message in a buffer, and initiating, if the synchronization is acquired with the second base station after saving the network connection request message, a network entry procedure using the network connection request message saved in the buffer.

In accordance with another exemplary embodiment of the present invention, a network connection apparatus of a mobile station is provided. The apparatus includes a connection manager for managing a firmware of the mobile station and for processing a network connection request message, a synchronization manager for processing a synchronization with a base station in response to a receipt of the network connection request message, a buffer for saving the network connection request message output by the connection manager, a message trigger for triggering the retrieval of the network connection request message from the buffer in response to a request of the synchronization manager, and a network entry processor for managing a network entry procedure with a new base station using the network connection request message saved in the buffer.

In accordance with yet another exemplary embodiment of the present invention, a network connection method of a mobile station is provided. The method includes checking whether a cell change from a first cell to a second cell is detected while waiting for a network connection request message, after an acquisition of a synchronization with a first base station associated with the first cell, determining, if the cell change is detected, whether a synchronization is acquired with a second base station associated with the second cell and whether the network connection request message is detected, initiating, if no cell change is detected, a network entry procedure with the first base station in response to a receipt of the network connection request message, initiating, if the network connection request message is detected after the synchronization is acquired with the second base station, a network entry procedure, saving, if the network connection request message is detected before the synchronization is acquired with the second base station, the network connection request message in a buffer, retrieving, when acquiring synchronization with the second base station, the network connection request message from the buffer, waiting for the synchronization with the second base station to be acquired, after saving the network connection request message, and initiating, if the synchronization is acquired with the second base station after saving the network connection request message, a network entry procedure using the network connection request message saved in the buffer.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description in conjunction with the accompanying drawings, in which.

Throughout the drawings, like reference numerals will be understood to refer to like parts, components and structures.

DETAILED DESCRIPTION OF EXEMPLARY EMBODIMENTS

Figure 1:
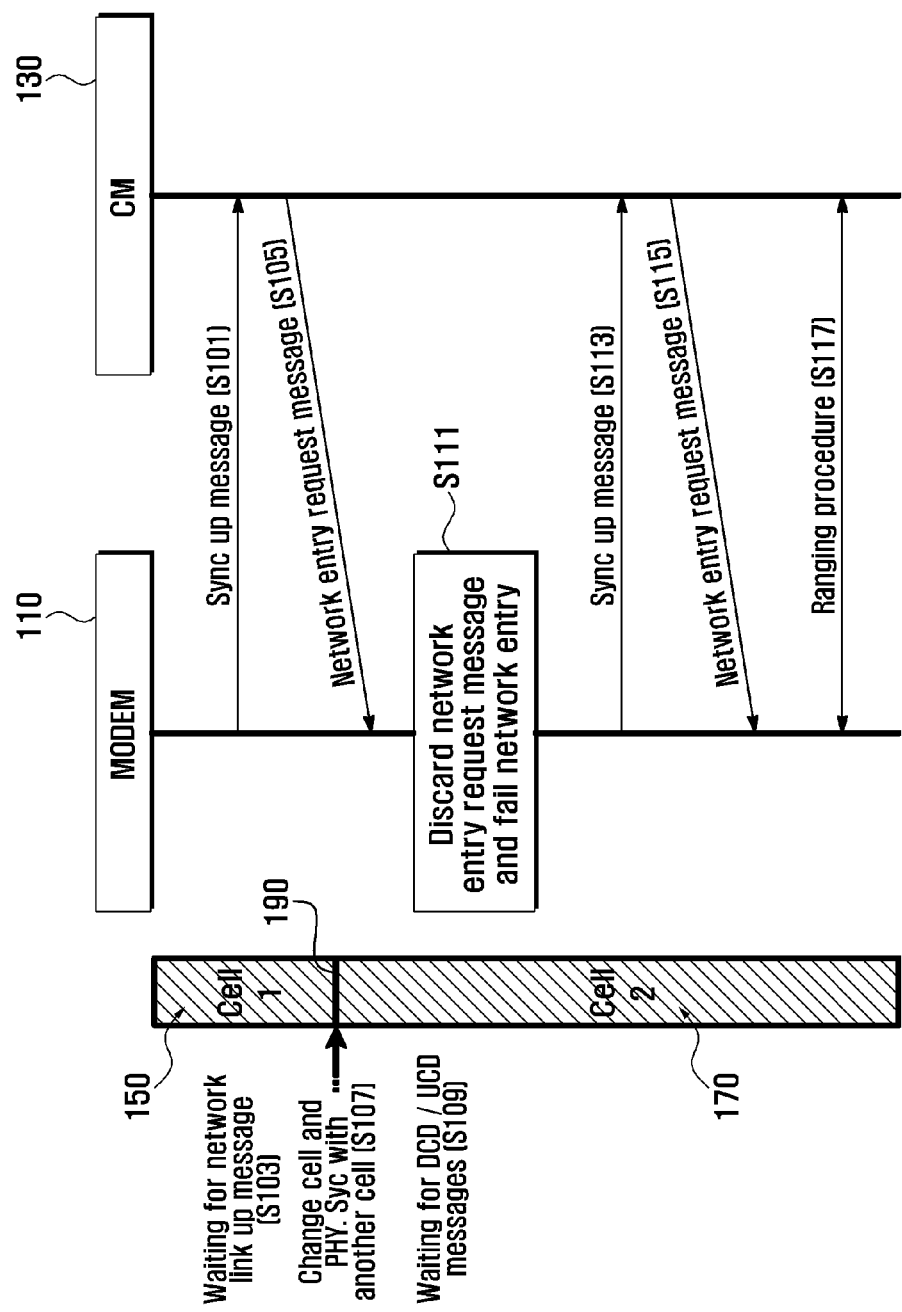
FIG. 1 is a message flow diagram illustrating an internal signaling of a mobile station during a call connection procedure of a network connection method according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and phrases used in the specification and appended claims are provided to enable a clear and consistent understanding of the detailed description and the claims. Unless otherwise noted, the terms and phrases are to be understood according to conventional usage by those skilled in the relevant art. While the invention is shown and described with reference to certain exemplary embodiments thereof, it will be understood by those skilled in the art that various changes in form and details may be made therein without departing from the spirit and scope of the invention as defined by the appended claims and their equivalents.

In the following description, a network connection method and apparatus of exemplary embodiments of the present invention are described in association with a WiBro network.

A mobile station may attempt a call connection, on the move, in an area in which two cells are overlapping. In the following description, the network connection method and apparatus of exemplary embodiments of the present invention are described in a situation where a mobile station moves across a boundary between two cells while attempting a call connection to a previous cell.

The base station (RAS) provides access service to at least one mobile station (PSS) located in its radio coverage area (cell). The base stations may be deployed such that their coverage areas are overlapping with each other. The mobile station may attempt to make a call connection to a base station in the overlapping area. Here, the mobile station may move out of the overlapping area into the cell of the other base station before the call connection is completed.

In this case, a conventional mobile station stops making the call connection to the base station of the old cell and attempts to make a new call connection to the base station of the new cell.

In the meantime, when the mobile station attempts to make a call connection, the modem of the mobile station performs a synchronization on the physical layer. After the physical layer synchronization is completed, the mobile station can receive an Uplink Channel Descript (UCD) message and Downlink Channel Descript (DCD) message from the base station. Upon receiving the UCD and DCD message, the mobile station performs a media access control (MAC) layer synchronization. At this time, the modem sends a Sync up message to a Connection Manager (CM), which is an upper layer application responsible for controlling a firmware of the mobile station.

FIG. 1 is a message flow diagram illustrating an internal signaling of a mobile station during a call connection procedure of a network connection method according to an exemplary embodiment of the present invention.

Referring to FIG. 1, when a mobile station attempts to make a connection to a base station of cell 1 150, a modem 110 of the mobile station performs a physical layer synchronization with the base station of the cell 1 150. After the physical layer synchronization has been achieved, the mobile station receives UCD/DCD messages from the base station of cell 1 150 and performs MAC layer synchronization with the base station of cell 1 150.

During the MAC layer synchronization, the modem 110 sends a Sync up message to a CM 130 in step S101 and waits to receive a Network link up message from the CM 130 in step S103. The Network link up message may be a network entry request message.

In response to the Sync up message, the CM 130 sends a Network entry request message to the modem 110 in step S105.

At this point, if the mobile station remained within cell 1, conventional internal signaling would be performed, wherein upon receiving the network entry request message, the modem 110 would perform a ranging process with the CM 130 in order for the mobile station to perform a network entry procedure with the base station of the cell 1 in step S117.

However, the mobile station may move out of cell 1 and into a cell 2 before completing the call connection to the base station of cell 1.

That is, the mobile station may move into cell 2 170 while the modem 110 waits to receive the Network entry request message from the CM 130 in step S107 at the time indicated by reference numeral 190. In this situation, if the mobile station moves from cell 1 150 to cell 2 170, it has to perform physical layer synchronization again with the base station of cell 2 170. After the physical layer synchronization is completed with the base station of cell 2 170, the modem 110 waits to receive the UCD/DCD messages from the base station of cell 2 170 in step S109. That is, the modem 110 determines if there has been a change of the current cell before receiving the network entry request message from the CM 130. If a cell change is detected before receiving the network entry request message from the CM 130, the modem 110 performs the physical layer synchronization again and waits for the UCD/DCD messages from the new cell for acquiring the MAC layer synchronization with the base station of the new cell.

However, if the MAC layer synchronization is acquired before receiving the network entry message, the conventional network entry procedure is performed.

On the other hand, if the network entry request message is received from the CM 130 in step S105 before acquiring the MAC layer synchronization, i.e. before receiving the UCD/DCD messages from the base station of cell 1 150, the modem 110 considers the network entry procedure as having failed in step S111. Sequentially, the modem 110 performs the synchronization process again and, if the MAC layer synchronization is acquired, sends the Sync up message to the CM 130 again in step S113.

That is, when the cell change is detected while waiting for the network entry request message from the CM 130, the modem 110 has to perform synchronization of the physical layer again. After the physical layer synchronization is completed, the modem 110 waits for a receipt of the UCD/DCD messages for the MAC layer synchronization. At this time, if the modem 110 receives the network entry request message associated with the cell 1 150 from the CM 130 before the MAC synchronization is acquired with the base station of cell 2 170, i.e. before receiving the UCD/DCD messages from the base station of cell 2 170, the modem considers the network entry procedure with the base station of cell 2 to have failed.

If the MAC layer synchronization is acquired afterward, the modem sends the Sync up message to the CM 130 in step S113 in order to retry to establish a connection to the base station of cell 2 170. Thereafter, in response to the Sync up message, the CM 130 sends a Network entry request message to the modem 110 in step S115. Upon receiving the network entry request message, the modem 110 would perform a ranging process with the CM 130 in order for the mobile station to perform a network entry procedure with the base station of cell 2 170 in step S117.

As described above, if a cell change is detected while the mobile station attempts to make a call connection to a base station, the mobile station has to perform the call connection procedure with the new base station, resulting in a reduction in the probability of a successful network connection and an increase in an average connection processing delay.

In an exemplary embodiment, the initiated call connection procedure would continue despite the detection of a cell change, thereby increasing the probability of a successful network connection and reducing the connection processing delay.

Figure 2:
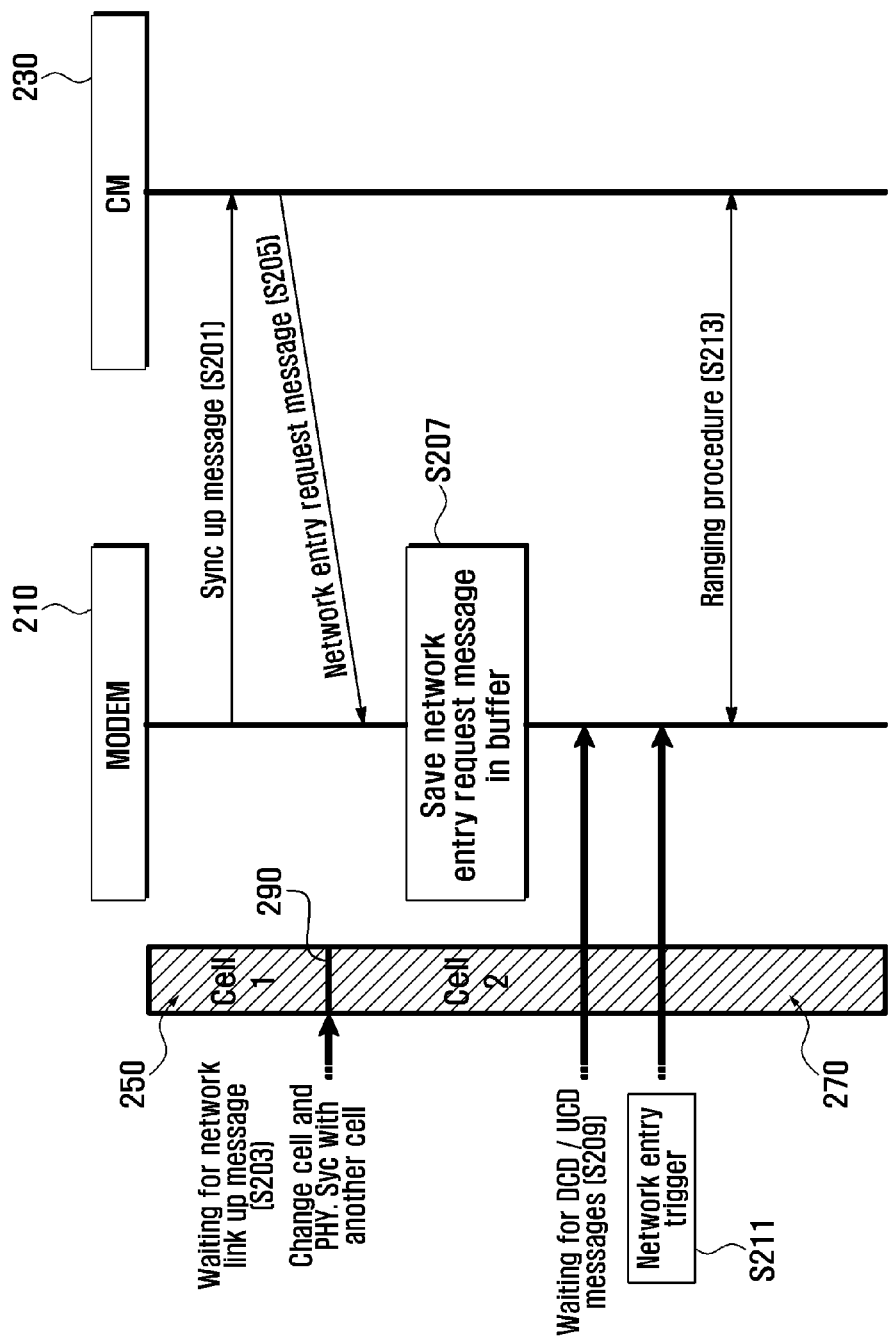
FIG. 2 is a message flow diagram illustrating an internal signaling of a mobile station during a call connection procedure of a network connection method according to another exemplary embodiment of the present invention.

FIG. 2 is a message flow diagram illustrating an internal signaling of a mobile station during a call connection procedure of a network connection method according to another exemplary embodiment of the present invention.

When a mobile station initiates a call connection on the move, it performs a synchronization procedure with a base station serving a cell in which the mobile station is located. After acquiring the synchronization, the base station transmits the DCD and UCD messages to the mobile station. Upon receiving the DCD and UCD messages, the mobile station starts a ranging procedure with the base station. In the following example, the description is focused on the operations of the mobile station and base station associated with the network connection method of an exemplary embodiment of the present invention.

Referring to FIG. 2, a mobile station attempts to make a call connection to a base station of cell 1 250 and a modem 210 of the mobile station performs a physical layer synchronization with the base station of cell 1 250. After the physical layer synchronization has been achieved, the mobile station receives UCD/DCD messages from the base station of cell 1 250 and performs MAC layer synchronization with the base station of the cell 250. When the MAC layer synchronization is acquired, the model 210 informs a CM 230 of the acquisition of the MAC layer synchronization. At this time, the modem 210 sends a Sync up message to the CM 230 in step S201. After sending the Sync up message, the modem 210 waits to receive a network link up message in step S203. Here, MAC layer acquisition means that the mobile station has received the UCD/DCD messages from the base station after the physical layer synchronization has been achieved.

Upon receiving the Sync up message from the modem 210, the CM 230 sends a network entry request message to the modem 210 in step S205.

Before receiving the network entry request message, the modem 210 may check whether a cell change is detected. If a cell change (i.e., cell 1 to cell 2) is detected before receiving the network entry request message as indicated by reference numeral 290, the modem 210 saves the network entry request message within a buffer in step S207.

That is, if the network entry request message is received from the CM 230, the modem saves the network entry request message in the buffer rather than processing it. Sequentially, the modem 210 acquires the MAC synchronization with the base station of cell 2 and then performs the network entry procedure using the saved network entry request message.

In more detail, in a case where a synchronization with cell 2 270 is not acquired, the modem 210 delays processing the network entry request message received from the CM 230 until the MAC synchronization is acquired with the base station of cell 2 270, i.e. until receiving the UCD/DCD messages from the base station of cell 2 270 in step S209. If the MAC synchronization with the base station of the cell 2 270 is acquired, the modem 210 triggers the network entry procedure using the saved network entry request message in step S211. Here, the modem 210 performs a ranging process with the CM 230 for triggering the network entry procedure in step S213. The ranging process between modem 210 and the CD 230 is out of the scope of the exemplary embodiment of the present invention and therefore a detailed description of the ranging process is omitted.

Figure 3:
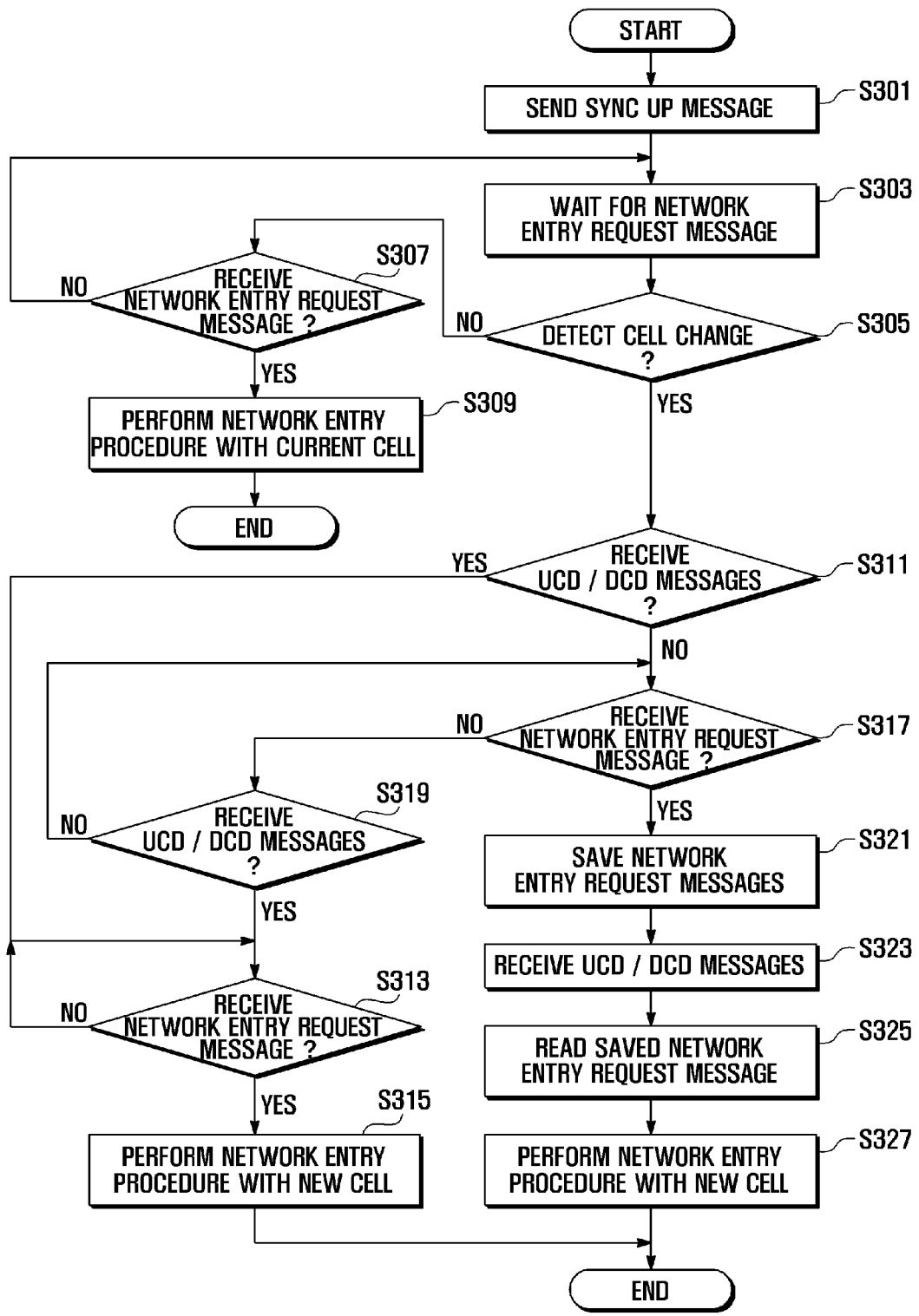
FIG. 3 is a flowchart illustrating a network connection initiation method for a mobile station according to an exemplary embodiment of the present invention.

FIG. 3 is a flowchart illustrating a network connection initiation method for a mobile station according to an exemplary embodiment of the present invention. More particularly, the network connection initiation method is described with an internal signaling of a mobile station for initiating a network entry procedure with a base station.

Referring to FIG. 3, a modem of the mobile station sends a Sync up message to a CM in step S301 and waits for the receipt of a network entry request message in step S303. While waiting for the receipt of the network entry request message, the modem checks whether a cell change of the mobile station is detected in step S305. If no cell change is detected, the modem determines whether the network entry request message is received from the CM in step S307. If no network entry request message is received, the modem continues waiting for the network entry request message in step S303 and continues to check whether the cell change is detected at step S305. If a network entry request message is received without detecting a cell change, the modem performs a network entry procedure with the base station of the current cell in step S309.

If a cell change is detected at step S305, the modem determines whether any UCD/DCD messages are received from the base station of a new cell in step S311. The modem regards the receipt of the UCD/DCD messages as the acquisition of the MAC layer synchronization. The acquisition of the MAC layer synchronization means that the modem has acquired the physical layer acquisition and then receives the UCD/DCD messages from the base station. After determining the acquisition of the MAC layer synchronization, the modem checks whether the network entry request message is received from the CM.

If it is determined that the UCD/DCD messages are received at step S311, the modem waits for the receipt of a network entry request message in step S313. If the network entry message is received, the modem performs a network entry procedure with the base station of the new cell in step S315.

If it is determined that no UCD/DCD messages are received from the base station of the new cell at step S311, the modem determines whether a network entry request message is received in step S317. If no network entry request message is received, the modem determines whether the UCD/DCD messages are received from the base station of the new cell in step S319 and, if no UCD/DCD messages are received, repeats step S317.

If a network entry request message is received at step S317, the modem saves the network entry request message in the buffer in step S321, waits and receives the UCD/DCD messages from the base station of the new cell in step S323. Upon receiving the UCD/DCD messages from the base station of the new cell, the modem reads the saved network entry request message from the buffer in step S325 and triggers the network entry procedure with the base station of the new cell using the read network entry request message in step S327.

As described above, when the network entry request message is received from the CM, the modem saves the network entry request message and determines whether the MAC layer synchronization has been acquired before processing the network entry request message. The modem initiates the network entry procedure using the saved network entry request message at the time when the MAC layer synchronization is acquired. If the MAC layer synchronization is not acquired, the modem may wait until the MAC synchronization is acquired. Once the MAC layer synchronization is acquired, the modem triggers the network entry procedure using the network entry request message saved in the buffer without transmitting the Sync up message to the CM.

As described above, the network connection method of an exemplary embodiment of the present invention can improve the probability of a successful network connection of the mobile station and reduce the call connection processing delay, especially when the mobile station moves across a boundary between cells without completing a call connection to a previous cell.

Figure 4:
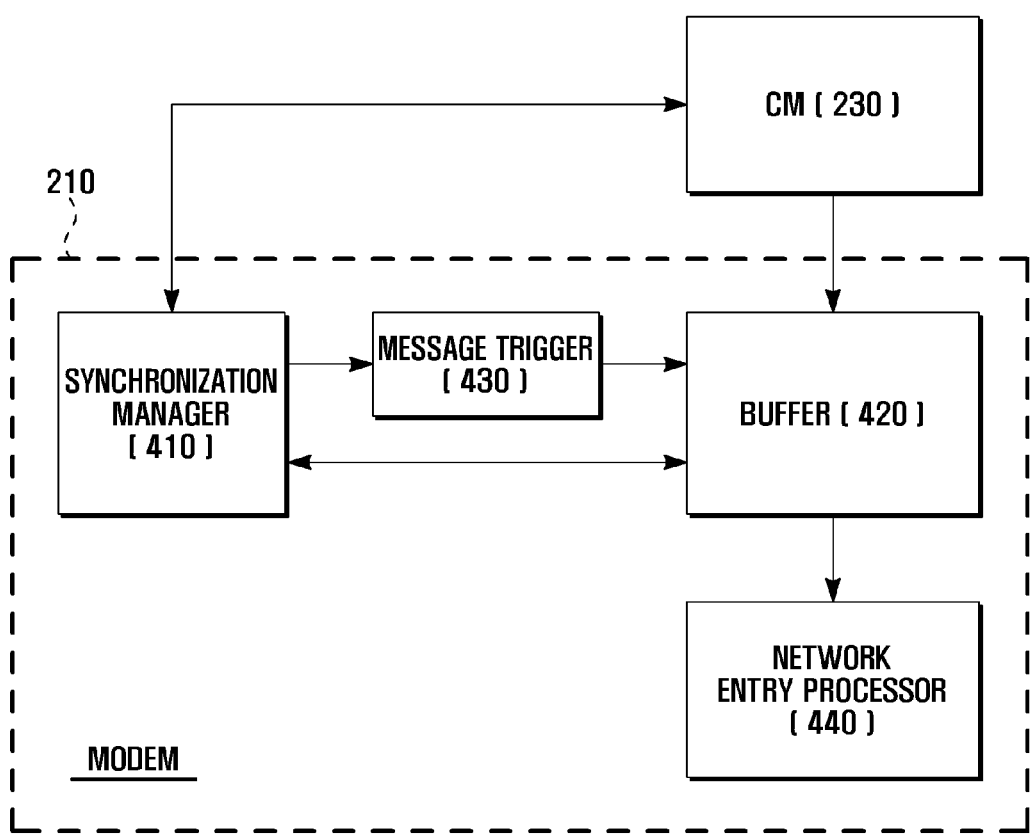
FIG. 4 is a block diagram illustrating a network connection apparatus of a mobile station according to an exemplary embodiment of the present invention.

FIG. 4 is a block diagram illustrating a network connection apparatus of a mobile station according to an exemplary embodiment of the present invention. Although the network connection apparatus is illustrated with exemplary internal components, the present invention is not limited to the configuration of FIG. 4. For example, the network connection apparatus may include other internal components associated with the operation of the mobile station.

Referring to FIG. 4, the network connection apparatus according to an exemplary embodiment of the present invention includes a modem 210 and a connection manager (CM) 230. The modem 210 includes a synchronization manager 410, a buffer 420, a message trigger 430, and a network entry processor 440.

The CM 230 is responsible for managing a firmware of the mobile station. In particular, the CM 230 can be implemented as an application for generating a network entry request message in response to a Sync up message received from the modem 210. The CM 230 sends the network entry request message to the buffer 420 under the control of the synchronization manager 410.

The synchronization manager 410 performs synchronization with a base station and checks whether MAC layer synchronization is acquired. The synchronization manager 410 generates a Sync up message, when the MAC layer synchronization is acquired, and sends the Sync up message to the CM 230. The synchronization manager 410 manages to store the network entry request message sent by the CM 230 within the buffer.

The buffer 420 stores the network entry request message sent by the CM 230 under the control of the synchronization manager 410. The buffer 420 outputs the network entry request message to the network entry processor 440 in response to a request of the message trigger 430.

The message trigger 430 requests the buffer to output the stored network entry request message to the network entry processor 440 in response to the request of the synchronization manager 410.

The network entry processor 440 performs a network entry procedure with a base station. More particularly, the network entry processor 440 also processes the network entry procedure with the base station of a new cell, into which the mobile station moves, using the network entry request message saved within the buffer 420.

As described above, the modem of the mobile station stores the network entry request message sent by the connection manager and performs a call connection procedure using the network entry request message according to the proceeding status of the call connection procedure, resulting in an improvement in the probability of a successful network connection of the mobile station especially when a cell change is detected during the call connection procedure.

Although the network connection apparatus of FIG. 4 is depicted schematically in structure, the present invention is not limited thereto. For example, the network connection apparatus may further include at least one of an antenna, a communication module, an input unit, a display unit, an audio processing unit, a control unit, a battery unit, etc. and their equivalents that can be integrated as a part of the mobile station equipped with the network connection apparatus. In addition, any of the components constituting the network connection apparatus may be deleted or replaced with a corresponding component.

Although the network connection method and apparatus are described in association with a specific communication system in the above embodiments, the present invention is not limited thereto. For example, the network connection method and apparatus can be applied to any communication system currently deployed or to be developed in the future.

Although the network connection method and apparatus is described in the context of a specific situation where a cell change is detected while the mobile station performing a call connection with a base station, the present invention is not limited thereto. For example, the network connection method can be applied to various call connection procedures.

Although the modem 210 depicted in FIG. 4 includes the synchronization manager 410, message trigger 430, buffer 420, and network entry processor 440, the modem can be implemented only with the synchronization manager 410 and the message trigger 430 while the buffer 420 and network entry processor 440 are implemented as separate components.

While the invention has been shown and described with reference to certain exemplary embodiments thereof, it will be understood by those skilled in the art that various changes in form and details may be made therein without departing from the spirit and scope of the invention, as defined by the appended claims and their equivalents.

As described above, the network connection method and apparatus of the present invention improves a probability of successful network connection of a mobile station to a network and reduces call connection processing delay, especially when the mobile station attempts a call connection while moving across a boundary between cells, by retaining the call connection attempt. More particularly, the network connection method and apparatus of the present invention can prevent ping-pong effects in an overlapping area and in a high mobility environment.

In addition, the network connection method and apparatus of the present invention can reduce repeated network entry procedures between a mobile station and multiple base stations, resulting in an improvement of radio resource efficiency.

What is claimed is:

1. A network connection method of a mobile station, the method comprising:
   checking whether a cell change from a first cell to a second cell is detected while waiting for a network connection request message, after an acquisition of a synchronization with a first base station associated with the first cell;
   determining, if the cell change is detected, whether a synchronization is acquired with a second base station associated with the second cell and whether the network connection request message is detected;
   initiating, if the network connection request message is detected after the synchronization is acquired with the second base station, a network entry procedure;
   saving, if the network connection request message is detected before the synchronization is acquired with the second base station, the network connection request message in a buffer; and
   initiating, if the synchronization is acquired with the second base station after saving the network connection request message, a network entry procedure using the network connection request message saved in the buffer.

2. The network connection method of claim 1, further comprising retrieving, when acquiring synchronization with the second base station, the network connection request message from the buffer.

3. The network connection method of claim 1, wherein the network connection request message comprises a network entry request message.

4. The network connection method of claim 1, further comprising waiting for the synchronization with the second base station to be acquired, after saving the network connection request message.

5. The network connection method of claim 1, wherein the synchronization comprises a media access control (MAC) layer synchronization.

6. The network connection method of claim 5, wherein the MAC layer synchronization is acquired when receiving uplink channel descript/downlink channel descript (UCD/DCD) messages from a corresponding one of the first and second base station.

7. The network connection method of claim 1, further comprising initiating, if no cell change is detected, a network entry procedure with the first base station in response to a receipt of the network connection request message.

8. A network connection method of a mobile station, the method comprising:
   checking whether a cell change from a first cell to a second cell is detected while waiting for a network connection request message, after an acquisition of a synchronization with a first base station associated with the first cell;
   determining, if the cell change is detected, whether a synchronization is acquired with a second base station associated with the second cell and whether the network connection request message is detected;
   initiating, if no cell change is detected, a network entry procedure with the first base station in response to a receipt of the network connection request message;
   initiating, if the network connection request message is detected after the synchronization is acquired with the second base station, a network entry procedure;
   saving, if the network connection request message is detected before the synchronization is acquired with the second base station, the network connection request message in a buffer;
   retrieving, when acquiring synchronization with the second base station, the network connection request message from the buffer;
   waiting for the synchronization with the second base station to be acquired, after saving the network connection request message; and
   initiating, if the synchronization is acquired with the second base station after saving the network connection request message, a network entry procedure using the network connection request message saved in the buffer.

9. The network connection method of claim 8, wherein the network connection request message comprises a network entry request message.

10. The network connection method of claim 8, wherein the synchronization comprises a media access control (MAC) layer synchronization.

11. The network connection method of claim 10, wherein the MAC layer synchronization is acquired when receiving uplink channel descript/downlink channel descript (UCD/DCD) messages from a corresponding one of the first and second base station.

* * * * *